July 22, 1952 W. LYONS 2,604,587

SIGNAL SELECTING MEANS

Filed Nov. 12, 1947 2 SHEETS--SHEET 1

INVENTOR
WALTER LYONS
BY Harry Tunick
ATTORNEY

July 22, 1952 W. LYONS 2,604,587

SIGNAL SELECTING MEANS

Filed Nov. 12, 1947 2 SHEETS—SHEET 2

INVENTOR
WALTER LYONS
BY Harry Tunick
ATTORNEY

Patented July 22, 1952 2,604,587

UNITED STATES PATENT OFFICE 2,604,587

SIGNAL SELECTING MEANS

Walter Lyons, Bayside, N. Y., assignor to Radio Corporation of America, a corporation of Delaware Application November 12, 1947, Serial No. 785,449

3 Claims. (Cl. 250—20)

In this application, I disclose an improved means for selecting the best version of several versions of a signal. The signal comprises currents which may represent side band energy or side band energy and carrier energy and noise components and other interfering components thereon. My invention is of particular use in diversity systems wherein to reduce the effects of fading, a plurality of signals are picked up and the best thereof selected for use.

In the prior art of diversity signalling, the signal version having the strongest carrier is usually selected. This does not always insure selection of the best signal because the strongest carrier may have the poorest signal to noise ratio.

The purpose of my invention is to provide a diversity system where the best signal is selected at all times. To do this, I produce in each receiver a potential proportional to the noise content which is used to decrease the gain in that receiver. Then in the gating or switching rectifier common load the potential is inversely proportional to the noise and directly proportional to the carrier strength. In other words, the switching potential available will be proportional to the signal to noise ratio and insure that the receiver in diversity connection, wherein the signal to noise ratio is best, will be utilized.

In my improved system, the diversity switching potential is proportional to the signal to noise ratio rather than to the signal plus noise voltage as in general practice in known diversity receiver systems. This relation between the switching potential and the signal noise ratio is obtained by including means, in addition to those usually included in receivers for diversity combination, to reduce the amplification in each receiver as the noise content of the signal in each receiver increases. The means I propose includes a band elimination filter inserted between or in the signal channel supplying only side band components of noise and signal, predominantly, and little carrier voltage to a rectifier. The rectified side band potential is used to decrease the amplification in the high frequency channel before the signal reaches the diversity switching means, so that the switching potential is inversely proportional to the noise and as before directly proportional to the carrier. Thus the switching diversity potential is proportional directly to the ratio of the carrier to noise.

In describing my invention in detail, reference will be made to the attached drawings, wherein.

Figure 1:
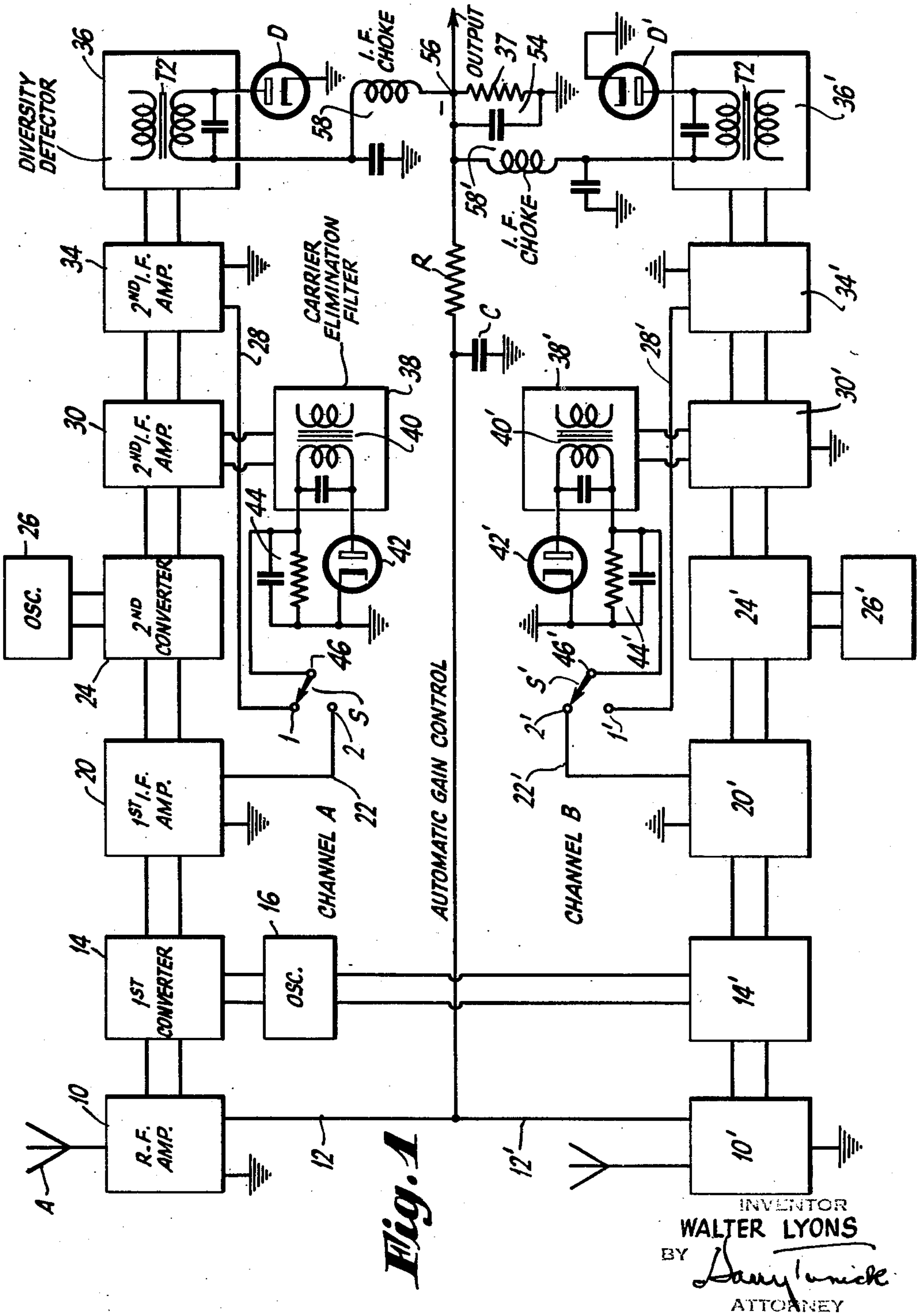
Fig. 1 illustrates by circuit element and circuit element connection a diversity system arranged in accordance with my invention. In this figure, many of the circuit elements are represented by rectangles since they are known in the art, and only those features which are novel have been shown by circuit connection.

In Fig. 1, I have shown a diversity system wherein two receivers are used. My invention is applicable to systems with three or more receivers in diversity. In Fig. 1, one channel is designated channel A, the other channel B. Both channels are essentially the same and one only thereof will be described. In the drawings, similar parts are designated by similar reference characters, those used in channel B being primed. An antenna A intercepts radiant energy and supplies it to a radio frequency amplifier 10 which may be conventional and includes therein a stage or stages with its or their grid biases controlled for automatic gain control purposes in the usual manner by potentials on lead 12. The amplified currents representing the signals are fed from the amplifier 10 to a first frequency converter 14. The first converter 14 is also supplied with oscillatory energy from source 16 so that a mixing action takes place in the converter, which may be conventional, and a selected beat note is supplied to the intermediate frequency amplifier 20 which may also include tube stages of controllable gain, being controlled as to grid bias in one embodiment by potentials supplied from lead 22 the nature of which potentials will be described hereinafter.

The beat frequency energy is supplied after amplification from unit 20 to a second converter 24 wherein a second mixing action takes place between the amplified intermediate frequency currents and oscillatory energy supplied from an oscillator 26. This second converter supplies beat frequency energy of a second intermediate frequency to an intermediate frequency amplifier 30 and from 30 to a second intermediate frequency amplifier 34 and from this amplifier to a signal demodulator or detector in unit 36. This detector or rectifier in 36 is the diversity detector and has as a load resistor the resistor 37. The converter 24, source 26 and two intermediate frequency amplifiers 30 and 34 and detector 36 may be conventional, except as otherwise pointed out hereinafter.

Some of the intermediate frequency energy is diverted from the intermediate frequency amplifier 30 and supplied to a carrier eliminating filter or network or circuit in 38. This carrier eliminating filter may be of a band pass type or tuned circuits or other network, wherein attenuation of the carrier with respect to side band energy takes place. The band eliminated may include carrier or carrier and side band components. The energy from which the carrier is eliminated in 38 is then fed to a detector or rectifier 42 to produce a potential which represents the components left after eliminating the carrier, and as a consequence this rectified potential is proportional to the remaining side band components representing the noise. In the embodiment illustrated, the resulting energy from which the carrier is removed more or less completely is supplied to a transformer 40, the secondary winding of which is in a rectifier circuit including diode 42 and load impedance 44 including a resistor and a capacitor in parallel. The diode is so poled that a negative potential is produced at the point 46 and this potential is supplied by switch S, in the #1 position, through lead 28 to the intermediate frequency amplifier stage 34 following the stage 30. When switch S is moved into the #2 position, the potential developed at point 46 is fed by lead 22 to intermediate frequency stages in the intermediate frequency amplifier 20 at a point preceding the stage 30 from which the energy providing said potential was diverted.

The rectifier 36 includes a diode D connected to the secondary winding of transformer T2 so poled that the potential developed in its load impedance 54 comprising a resistor 37 and condenser in parallel is negative at the point 56. The load impedance 54 is the output impedance and is common to all of the receivers in the diversity connection. An alternating current filtering network 58 may be included in each of the connections between the several diodes and the common load resistor 54. The point 56 on the load impedance 54 is connected to the automatic gain control circuit 12 by a time constant network CR. The potential at 56 thus provides the diversity switching action by blocking out or reducing output from those rectifier stages 36, 36′, etc., getting the weakest signals, and letting through output from that rectifier getting the strongest signal. This potential also operates in a conventional manner to control the gain in the several receivers.

The noise components rectified in diode 42 and appearing across impeder 44 are applied to switch point 1 and through lead 28 to control the gain of amplifier 34 so that its gain is reduced as the noise components increase. Thus, this receiver now supplies at the point 56 a potential which is reduced as the noise increases and the resultant potential at 56 with my additional rectifier stage 40, 42, 44 in operation is less than the potential would be at this point without my additional rectifier stage. The total potential appearing at the point 56 to ground is thus inversely proportional to the total noise on the several receivers.

Thus, it will be noted that with the automatic gain control action taking place in the stage 34 following the stage 30, each receiver of the system may have a falling input voltage versus output potential characteristic, considering the noise rectifier action alone. If the switch S is in the #2 position so that the noise control potential is supplied by lead 22 to the stage 20 to control its gain in the same manner, the effect is substantially the same as described hereinbefore with this difference. Since the stage 20 wherein the gain control action takes place precedes the stage 30 from which the intermediate frequency energy is diverted the control potential produced at individual receivers will never be fully compensated. The system will have a rising characteristic and therefore involves simple design problems.

Figure 3:
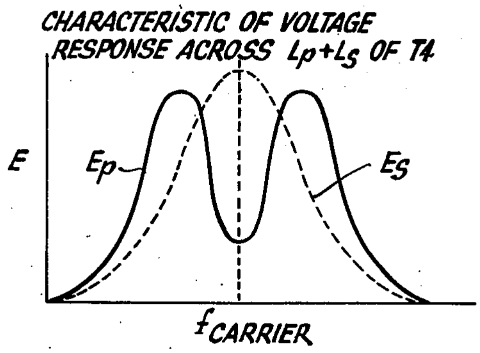
Fig. 3 are curves illustrating the characteristics of the transformer T4 of Fig. 2, which reduces the carrier voltage in the embodiment of Fig. 2.

The filter network in unit 38 for removing or eliminating the carrier may have a characteristic substantially as illustrated by the curve EP in Fig. 3.

Figure 2:
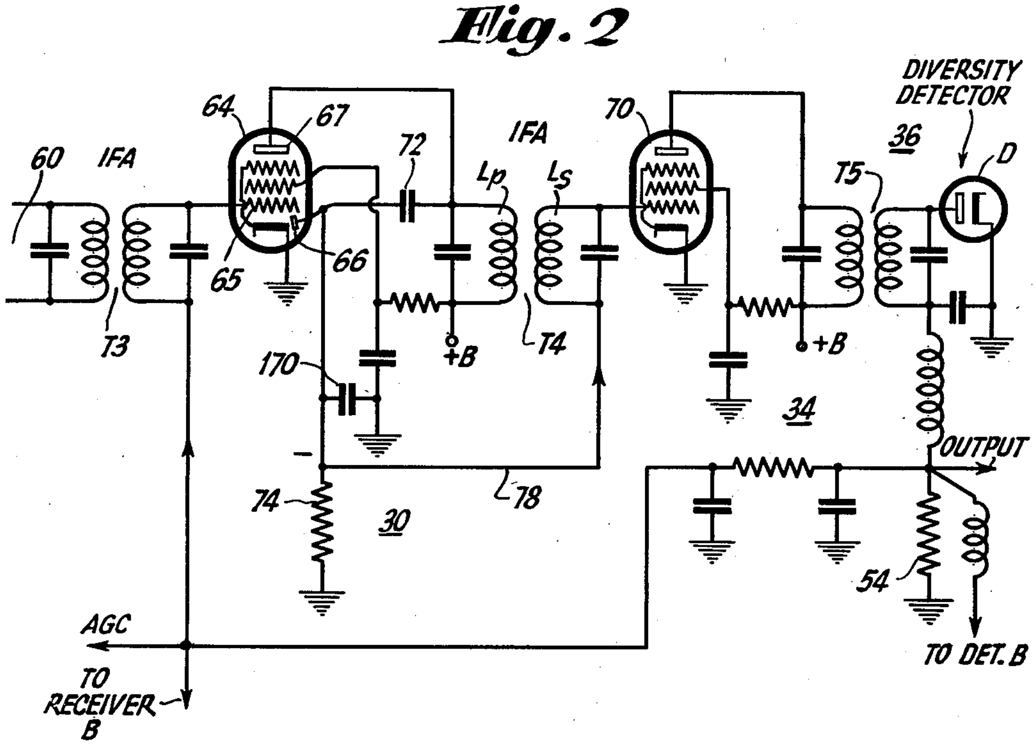
Fig. 2 illustrates a modification of the arrangement of Fig. 1.

In Fig. 2, I have illustrated a specific slightly modified embodiment of the arrangement of Fig. 1. In Fig. 2, I have omitted all of the circuit elements except the stages 30 and 34 of one receiver of Fig. 1. The output from stage 24 then appears in leads 60 and is supplied by transformer T3 to the control grid 65 of the tube 64. The tube 64 includes in addition to the amplifying electrodes, a diode including the tube cathode and an anode 66. The anode 67 of the tube 64 is connected to the primary winding of transformer T4, the secondary winding of which supplies input to an additional stage including tube 70 and transformer T5 feeding the diode rectifier D in stage 36. The diode anode 66 is coupled by condenser 72 to the transformer T4 primary winding $Lp$ and the transformer winding LP has a voltage developed thereacross which may be represented by the curve EP in Fig. 3. The rectifier 66, winding LP and capacitors 170 and 72 form a voltage peak rectifier so that the voltage developed across the load resistor 74 also has a characteristic similar to that shown at EP in Fig. 3. The voltage rectified across resistor 74 represents primarily noise components and other voltages left after a substantial reduction in carrier and signal side bands. This potential representing primary noise is then applied by lead 78 and the secondary winding LS to the control grid of tube 70 to reduce its gain as the noise increases for the purpose set out in detail hereinbefore. The secondary winding LS has a characteristic as illustrated at ES in Fig. 3 and supplies signal to the stage 34 substantially in accordance with carrier strength and thus the signal is amplified and supplied to the output detector stage 36 for use. The switching and gain control potential as developed across the output impedance 54 is proportional to the signal to noise ratio as herein described before.

What is claimed is:

1. In a receiver system for signals comprising high frequency currents representing carrier and side band energy including two variable gain amplifiers coupled in cascade with the input of the first amplifier excited by said currents, a detector coupled to the output of the second amplifier, an output circuit for said detector including an impedance wherein is produced a potential which is proportional to the signal strength, means for controlling the gain of the first amplifier inversely in accordance with said potential, separate means for developing a potential proportional solely to the magnitude of the currents representing only side band energy, and means for controlling the gain of the second amplifier inversely solely in accordance with said developed potential representing only sideband energy.

2. In a diversity system for signals comprising side bands including noise components, a plurality of receivers each including an amplifier of variable gain, means for impressing a different version of said signal on each receiver, a detector in each receiver, a common load impedance connected to all of said detectors across which impedance is produced a potential proportional to the signal strength, a carrier elimination filter in each receiver excited by the signal in the corresponding receiver, said amplifier in each receiver preceding the stage in each receiver supplying signal excitation to said filter, a rectifier system including an additional load impedance connected to the output of each filter, the potential produced in each additional impedance increasing with increases in magnitude of the energy passed by the corresponding filter, and means connecting the additional load impedance of each receiver to its amplifier to control the gain thereof in accordance with the corresponding last-named potential.

3. In a diversity system for signals comprising side bands including noise components, a plurality of receivers each including an amplifier of variable gain, means for impressing a different version of said signal on each receiver, a detector in each receiver, a common load impedance connected to all of said detectors across which impedance is produced a potential proportional to the signal strength, a single carrier elimination filter in each receiver excited by the signal in the corresponding receiver, said amplifier in each receiver following the stage in each receiver supplying signal excitation to said filter, a rectifier system including an additional load impedance connected to the output of each filter, the potential produced in each additional impedance increasing with increases in magnitude of only that energy passed by the corresponding filter, and means connecting the additional load impedance of each receiver to its amplifier to control the gain thereof solely in accordance with the corresponding last-named potential dependent on the magnitude of only that energy passed by the respective carrier elimination filter.

WALTER LYONS.

REFERENCES CITED

The following references are of record in the file of this patent:

UNITED STATES PATENTS

| Number | Name | Date |
|---|---|---|
| 2,031,607 | Kane | Feb. 25, 1936 |
| 2,196,259 | Foster | Apr. 9, 1940 |
| 2,236,497 | Beers | Apr. 1, 1941 |
| 2,237,457 | Tellegen | Apr. 8, 1941 |
| 2,384,456 | Davey | Sept. 11, 1945 |
| 2,420,868 | Crosby | May 20, 1947 |
| 2,504,341 | Matthews | Apr. 18, 1950 |
| 2,511,014 | Schultz | June 13, 1950 |

FOREIGN PATENTS

| Number | Country | Date |
|---|---|---|
| 197,077 | Great Britain | May 10, 1923 |